US008980075B2

(12) United States Patent
Cheng et al.

(10) Patent No.: US 8,980,075 B2
(45) Date of Patent: Mar. 17, 2015

(54) DIGITAL MICROFLUIDIC PLATFORM FOR ACTUATING AND HEATING INDIVIDUAL LIQUID DROPLETS

(75) Inventors: Xing Cheng, College Station, TX (US); Kamran Entesari, College Station, TX (US)

(73) Assignee: The Texas A & M University System, College Station, TX (US)

( * ) Notice: Subject to any disclaimer, the term of this patent is extended or adjusted under 35 U.S.C. 154(b) by 161 days.

(21) Appl. No.: 13/560,448

(22) Filed: Jul. 27, 2012

(65) Prior Publication Data

US 2013/0026040 A1 Jan. 31, 2013

Related U.S. Application Data

(60) Provisional application No. 61/513,319, filed on Jul. 29, 2011.

(51) Int. Cl.
*G02B 1/06* (2006.01)
*G01N 13/00* (2006.01)
*B01L 3/00* (2006.01)

(52) U.S. Cl.
CPC ..... *B01L 3/502792* (2013.01); *B01L 2300/161* (2013.01); *B01L 2300/1827* (2013.01); *B01L 2400/0427* (2013.01)
USPC ............ 204/600; 359/665; 359/666; 204/450

(58) Field of Classification Search
CPC ..... G01N 13/00; G01N 2013/00; G02B 1/06; B01L 3/502; B01L 2400/0427
USPC ............ 204/450, 600; 435/287.1; 422/82.01, 422/68.1; 259/665, 666
See application file for complete search history.

(56) References Cited

U.S. PATENT DOCUMENTS 7,163,612 B2 1/2007 Sterling et al. ................ 204/600
7,216,660 B2 5/2007 Troian et al. .................... 137/13

(Continued)

FOREIGN PATENT DOCUMENTS

WO 2007-120241 10/2007
WO 2010-009463 1/2010

(Continued)

OTHER PUBLICATIONS

Dehu Cui, Muchuan Yang, Paul Miller, Kamran Entesari and Xing Cheng, "EWOD-Based Droplet Actuation by Active-Matrix Electrode Array", *The 55th International Conference on Electron, Ion and Photon Beam Technology and Nanofabrication*, Las Vegas, NV, May 31-Jun. 3, 2011.

(Continued)

*Primary Examiner* — Jennifer Dieterle
(74) *Attorney, Agent, or Firm* — Wong, Cabello, Lutsch, Rutherford & Brucculeri LLP

(57) ABSTRACT

A digital microfluidic platform utilizes dual active matrix circuitry to actuate and heat liquid droplets on a biochip. Liquid droplets are introduced into a droplet handling area of the biochip where they can be actuated by electrodes residing in pixels of an actuating active matrix array according to the electrowetting on dielectric phenomenon and heated by heating elements residing in pixels of a heating active matrix array. Pixels of the actuating active matrix array and the heating active matrix array are independently addressable such that droplets in the droplet handling area can be selectively heated and actuated according to their location. The actuating active matrix array and heating active matrix array can be formed on the same or different substrates with the droplet handling area disposed above or between the substrates.

7 Claims, 7 Drawing Sheets

(56) References Cited

U.S. PATENT DOCUMENTS

| | | | | |
|---|---|---|---|---|
| 8,339,711 | B2 * | 12/2012 | Hadwen | 359/665 |
| 2006/0194331 | A1 | 8/2006 | Pamula et al. | 436/150 |
| 2008/0274513 | A1 * | 11/2008 | Shenderov et al. | 435/91.2 |
| 2011/0268151 | A1 * | 11/2011 | Hadwen et al. | 374/141 |
| 2011/0272575 | A1 * | 11/2011 | Kim et al. | 250/288 |

FOREIGN PATENT DOCUMENTS

| | | |
|---|---|---|
| WO | 2010-141104 | 12/2010 |
| WO | 2011-002957 | 1/2011 |
| WO | 2011-023949 | 3/2011 |

OTHER PUBLICATIONS

Xing Cheng and Kamran Entesari, "A Novel All-Purpose Programmable and Scalable Biochip for Biomedical Applications," Internal Presentation (Jun. 19, 2009).

Xing Cheng, Kamran Entesari, and James Sacchettini, "A Novel All-Purpose Programmable and Scalable Biochip for Biomedical Applications", Proposal for National Institutes of Health—NCRR Grant (Project Start Date Sep. 15, 2010).

International Search Report and Written Opinion from counterpart PCT application No. PCT/US2012/048487, dated May 9, 2013.

* cited by examiner

DIGITAL MICROFLUIDIC PLATFORM FOR ACTUATING AND HEATING INDIVIDUAL LIQUID DROPLETS

CROSS-REFERENCE TO RELATED APPLICATIONS

This is a non-provisional filing of U.S. Provisional Patent Application Ser. No. 61/513,319, filed Jul. 29, 2011, to which priority is claimed, and which is incorporated by reference in its entirety, including its Appendices.

STATEMENT REGARDING GOVERNMENT INTERESTS

This work was supported in part by a grant from the National Institute of Health (Award Reference No. 21RR026227). The government may have certain rights in this invention.

BACKGROUND

This disclosure relates generally to the field of microfluidic technologies. More particularly, but not by way of limitation, it relates to the use of dual active matrix circuitry to individually actuate and heat liquid droplets on a biochip.

In recent years, biochip devices have attracted huge interests in scientific research applications because they are capable of carrying out highly repetitive laboratory tasks with a small fluid volume, thus saving time and materials. Traditional biochip devices use micro and nanofluidic channels to manipulate fluids of interest based on the principles of continuous fluid flow. The complexity in integrating large numbers of micropumps, microvalves, and microchannels into a channel based biochip, however, limits the scope of the analytical problems these devices can address.

Furthermore, most biochip devices reported in literature today still require application specific design and fabrication, which is a laborious and time consuming process. Because current biochip development is based on a one-application-one-implementation model, communication is required between biochip end users and device engineers for each analytical or synthetic task to be addressed.

For microfluidic biochip devices to become viable took for biologists, chemists, clinicians, field officers, and public health officials, they must be constructed in a manner that allows users to focus on the specific tasks they are interested in without worrying about the design principles of the biochip. Though efforts have been devoted to developing standardized computer-aided design protocols to facilitate communication and simplify biochip development, custom fabrication of a biochip is still required for each specific task to be addressed. Accordingly, a significant amount of effort, time, and cost are associated with the development and manufacture of an effective biochip. These disadvantages prevent the full realization of the benefits of biochips and have resulted in most biochips being utilized in research labs with limited real world application.

It would be desirable to provide a biochip device that overcomes the complexity and corresponding limitations of a channel based biochip device. It would further be desirable to provide a biochip device that is both easily customizable by an end user to perform a specific set of tasks sought to be performed by the user and reusable to perform a different set of tasks. It would further be desirable to provide a biochip device capable of achieving precise control of process conditions for the specific tasks to be performed.

SUMMARY

In a first embodiment, a device for manipulating droplets of fluid includes a first substrate having a plurality of pixels arranged in rows and columns. Each pixel includes a first switch coupled to an electrode that is individually controllable to move a fluid droplet and a second switch coupled to a heating element that is individually controllable to heat a droplet proximate to the heating element. A droplet handling area is disposed above the first substrate and includes at least one fluid input port for introducing a droplet into the droplet handling area and at least one fluid output port for removing a droplet from the droplet handling area. The droplet handling area may be protected from above by a second substrate.

In a second embodiment, a device for manipulating droplets of fluid includes a first substrate having a plurality of pixels arranged in rows and columns and a second substrate having a plurality of pixels arranged in rows and columns. Each pixel of the first substrate includes a switch coupled to an electrode that is individually controllable to move a fluid droplet. Each pixel of the second substrate includes a switch coupled to a heating element that is individually controllable to heat a droplet proximate to the heating element. A droplet handling area is disposed between the first substrate and the second substrate and includes at least one fluid input port for introducing a droplet into the droplet handling area and at least one fluid output port for removing a droplet from the droplet handling area.

In a third embodiment, a device for manipulating droplets of fluid includes a first substrate having a plurality of pixels arranged in rows and columns and a second substrate having a plurality of pixels arranged in rows and columns. Each pixel of the first substrate includes a switch coupled to an electrode that is individually controllable to move a fluid droplet. Each pixel of the second substrate includes a switch coupled to a heating element that is individually controllable to heat a droplet proximate to the heating element. The second substrate is affixed to and underneath the first substrate. A droplet handling area is disposed above the first substrate and includes at least one fluid input port for introducing a droplet into the droplet handling area and at least one fluid output port for removing a droplet from the droplet handling area. The droplet handling area may be protected from above by a third substrate.

DETAILED DESCRIPTION

The following is a detailed description for carrying out embodiments of the invention. This description is not to be taken in a limiting sense, but is made merely for the purpose of illustrating the general principles of the example embodiments of the invention.

Use of the term "biochip" throughout this disclosure is not intended to imply a limitation of the disclosed device to only biological or biomedical applications. It will be understood that the disclosed device, due to its ability to perform in a wide variety of fields, may also be described as a "lab-on-a-chip" device.

Figure 1:
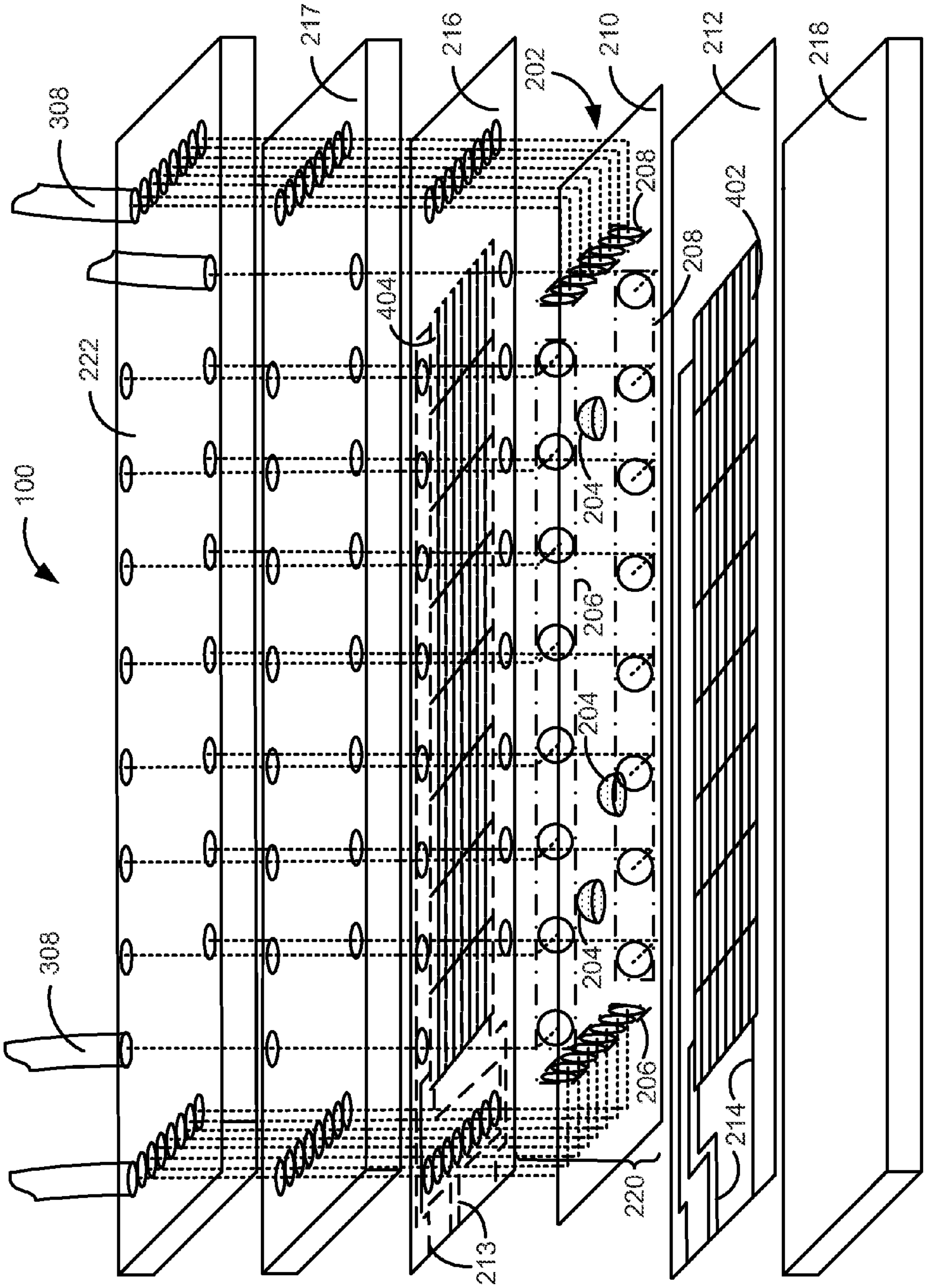
FIG. 1 is an exploded perspective view of a biochip according to one embodiment.

Referring to FIG. 1, in an example embodiment, a digital biochip with dual active matrix circuitry 100 illustrates a method to overcome the complexity of channel based biochip devices by using droplet based digital microfluidics to manipulate liquid droplets. According to the electrowetting on dielectric (EWOD) phenomenon, liquid droplets on a dielectric material may be manipulated based on changes in surface energy resulting from the presence of an electric charge at the interface of the liquid droplet and the dielectric material. Therefore, a droplet can be actuated by an electrode located beneath the dielectric material upon which the droplet resides, thus greatly reducing the clutter of channel-based fluidic systems by separating fluidic components from actuation components. The EWOD phenomenon is not limited to aqueous solutions; other solvent and ionic liquid droplets can also be used.

The droplet handling area 202 of the digital biochip 100 consists of a large two dimensional array of unbounded microfluidic tracks forming imaginary fluid conduits on which individual droplets 204 on the order of microliters to picoliters are actuated by the EWOD effect. Liquid droplets are introduced into the droplet handling area 202 through fluid input ports 206 along two edges of the biochip 100 and are expelled through fluid output ports 208 along opposing edges of the biochip 100. Liquid droplets 204 are actuated along an ultrahydrophobic surface 210 which reduces the driving voltage needed to move the droplets. In one embodiment, the ultrahydrophobic surface may be a fluoropolymer such as Teflon® AF. The ultrahydrophobic surface 210 may be applied to the actuating substrate 218 using well known methods such as spin coating and/or dip coating. The ultrahydrophobic surface 210 additionally allows the biochip 100 to be easily cleaned by running pure de-ionized water over the surface due to its hydrophobic properties, allowing the biochip 100 to be reused without worrying about cross contamination.

Actuation of the liquid droplets 204 is controlled by electrodes 215 (not depicted in FIG. 1 for purposes of clarity) distributed in an actuating active matrix array 212 disposed on an actuating substrate 218 located below the ultrahydrophobic surface 210. Pixels are formed by the intersection of row and column bus lines 214 of the actuating active matrix array 212. Each electrode 215 resides in a pixel and is electrically coupled to a switching transistor as will be described in further detail below.

A heating active matrix array 216 disposed on a heating substrate 217 is incorporated above the droplet handling area 202 of the biochip. Pixels are formed by the intersection of row and column bus lines 213 of the actuating heating active matrix array 216. In one embodiment, the heating active matrix array 216 may contain an identical number of pixels as the actuating active matrix array 212 such that each pixel of the heating active matrix array 216 corresponds to a pixel of actuating active matrix array 212. Rather than an electrode 215 used to actuate liquid droplets, however, each pixel of the heating active matrix array 216 contains a micro-resistive heating element 224 (not depicted in FIG. 1 for purposes of clarity) that generates heat as a result of current flowing through the element when the specific pixel is selected. In one embodiment, each pixel of the heating active matrix array 216 may additionally contain a temperature sensing element having an output current or voltage that is a function of temperature. The temperature sensing elements may provide signals to a biochip control device, allowing the control device to provide individual temperature control for each liquid droplet. The individual control of droplet temperature adds further flexibility in addressing analytical and synthetic tasks when heating is required.

In one embodiment, the micro-resistive heating elements 224 may be composed of metal wires, polysilicon, or conductive oxide materials such as indium tin oxide (ITO), fluorine-doped tin oxide (SnO), or zinc oxide (ZnO). These conductive oxides are transparent and may therefore allow optical techniques such as fluorescence to be used to monitor and characterize the reactions inside a droplet of the biochip in real time.

Spacer 220 separates heating substrate 217 from actuating substrate 218 and allows for the actuation of liquid droplets 204 within droplet handling area 202. Spacer 220 is illustrated more clearly in FIG. 2. The actuating active matrix array 212 and heating active matrix array 216 face towards the droplet handling area 202. Stated differently, each of the actuating 212 and heating 216 active matrix arrays are formed on a top of their respective substrates and the biochip 100 is assembled with the tops of the actuating substrate 218 and heating substrate 217 facing droplet handling area 202. In the illustrated embodiment, biochip 100 is protected by top cap glass substrate 222.

Due to the characteristics of active matrix circuitry, each pixel can be individually addressed without interfering with any other pixels in the array, thus achieving the ability to address individual droplets in a huge array. Accordingly, liquid droplets may be individually actuated by the actuating active matrix array 212 and individually heated by the heating active matrix array 216. This characteristic allows for parallel processing of multiple droplets contemporaneously. Furthermore, active matrix circuitry is a robust technology that has been widely used in high information content that panel displays such as laptop screens that contain millions of pixels. The proposed biochip, therefore, could be scaled up to handle tens of thousands or even millions of droplets simultaneously, bringing unprecedented power to scientists and engineers for advanced applications.

In one embodiment, the biochip device 100 may be constructed such that fluidic control instruments such as micropumps and microvalves that facilitate the introduction of fluid droplets to the biochip 100, and the active matrix circuitry signals that actuate and heat the droplets are controlled from a common device. For example, both fluidic and active matrix circuitry controls may interface with a computer, allowing easy control of the biochip and dynamic reconfiguration of the biochip through software installed on a single device.

In one embodiment, the software may incorporate droplet manipulation algorithms which serve as the user-biochip interface. The fundamental steps of droplet handling are droplet moving, merging, and splitting. Any analytical or synthetic task can be broken down into a sequential combination of these fundamental steps regardless of the task's size and complexity. Active matrix driving algorithms to achieve these fundamental steps will serve as building blocks for developing application specific protocols. With these algorithms, end users need only focus on developing their application protocols based on the physics and chemistry of their task, and can accomplish their goals without any knowledge of the lower level construction of the biochip. The abstraction of real world application from biochip construction and droplet handling enables the biochip to be dynamically reconfigured for almost any tasks through computer software, achieving ultimate flexibility and usability.

Figure 2:
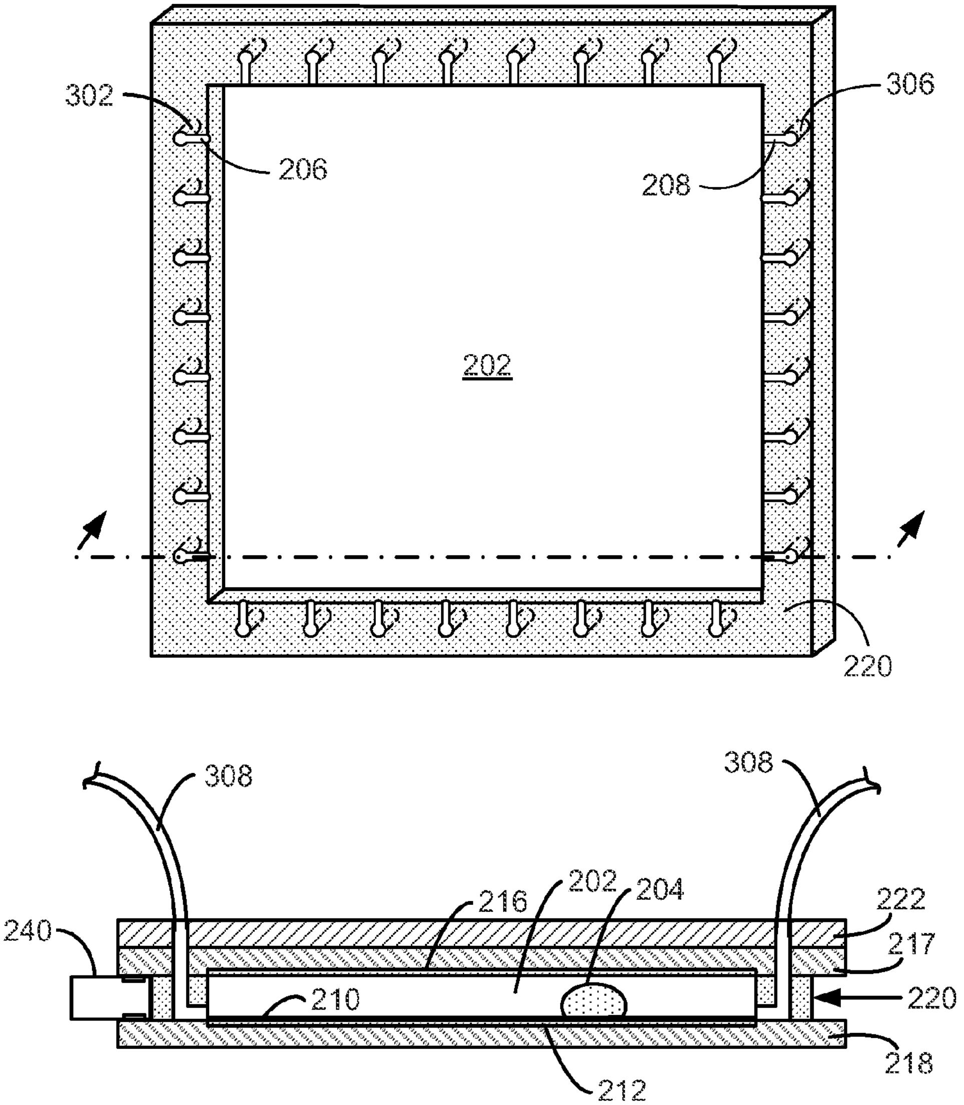
FIG. 2 provides a perspective view and a cross-sectional view of a spacer that forms the fluid handling portion of a biochip according to one embodiment.

Referring to FIG. 2, in an example embodiment, a spacer 220 forms the droplet handling area 202 of biochip 100. Spacer 220 may be formed from a material such as glass with various portions etched away to form the droplet handling area 202 of biochip 100. An area within the inner perimeter of spacer 220 may correspond approximately to the location of the electrical circuitry of actuating active matrix array 212 and heating active matrix array 216 on their respective substrates while an outer perimeter of spacer 220 may allow for the placement of connector 240 to deliver electrical signals to the actuating and heating circuitry. As is illustrated, fluid droplets 204 may be manipulated within the area inside the inner perimeter of spacer 220. Holes along two edges of spacer 220 extend through spacer 220 from top to bottom forming fluid input reservoirs 302. Fluid may be introduced to the fluid input reservoirs 302 by means of tubing 308 connected to the fluid input reservoirs 302. Tubing 308 may be on the order of approximately one millimeter in diameter. The flow of fluid to the biochip may be controlled by off-chip fluidic instrumentation such as micropumps and microvalves. Fluid droplets are transmitted from fluid input reservoirs 302 to the actuating active matrix array 212 through fluid input ports 206 etched as horizontal channels in spacer 220 between fluid input reservoirs 302 and the inner perimeter of spacer 220.

Along two edges of spacer 220 opposite fluid input ports 206, holes extend through spacer 220 from top to bottom forming fluid output reservoirs 306. Fluid droplets may be transmitted from the actuating active matrix array 212 to fluid output reservoirs 306 via fluid output ports 208 etched as horizontal channels between the inner perimeter of spacer 220 and fluid output reservoirs 306. Fluid from the output reservoirs 306 may be manually transmitted from the biochip to an analysis device, for example, by pipette. Accordingly, fluid can be withdrawn from an output reservoir 306 and then a different sample can be transmitted to the same output reservoir 306 using the actuating matrix array 212. Alternatively, fluid could be automatically transmitted from output reservoirs 306 to analysis equipment by means of tubing 308 connected to output reservoirs 306, in which case output reservoirs 306 may mirror input reservoirs 302.

In the depicted embodiment, the vertical holes forming fluid input reservoirs 302 and output reservoirs 306 may also extend through heating substrate 217 and top cap glass 222. In an alternate embodiment, as described in detail below, actuating and heating circuitry may be either formed on a single substrate or on two stacked substrates below the droplet handling area 202. In either case, spacer 220 may be modified to both form the droplet handling area 202 as well as serve as top cap glass 222. In such an embodiment, the inner perimeter of spacer 220 may only be recessed rather than removed such that spacer 220 might cover droplet handling area 202.

Figure 3:
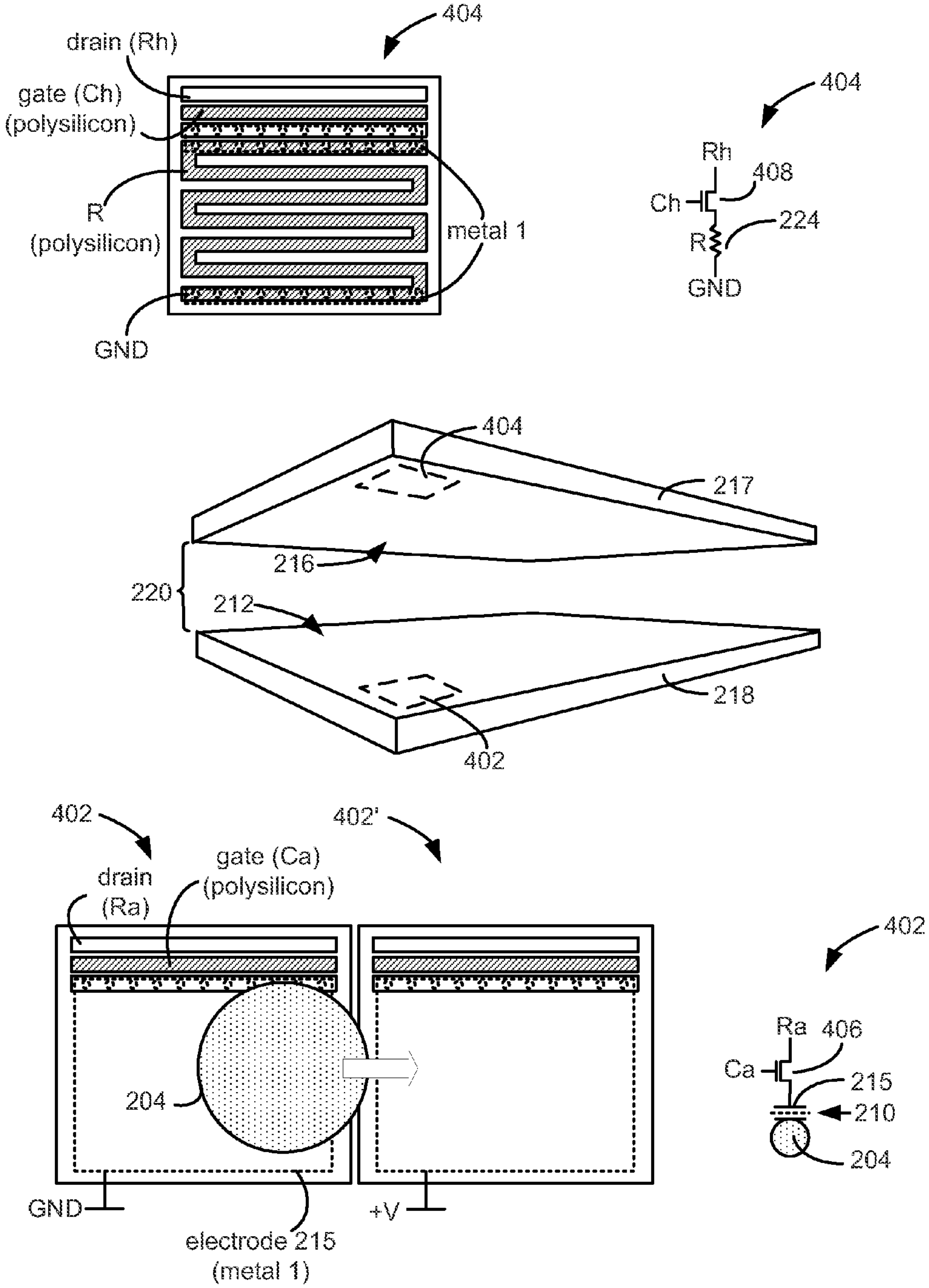
FIG. 3 is a perspective view of the biochip device of FIGS. 1 and 2 with certain elements removed to more clearly illustrate the actuating and heating active matrix circuitry of the biochip according to one embodiment.

Referring to FIG. 3, certain elements of the example embodiment depicted in FIGS. 1 and 2 have been removed in order to illustrate the heating and actuating circuitry of the biochip. As was depicted in FIGS. 1 and 2, a droplet handling area 202 is formed between a heating substrate 217 and an actuating substrate 218 upon which the heating active matrix array 216 and actuating active matrix array 212 are formed, respectively.

The formation of the actuating active matrix circuitry of an individual actuating pixel 402 on actuating substrate 218 is illustrated. As will be understood by one of ordinary skill in the art, an actuating transistor 406 is formed as a field effect transistor in the actuating substrate 218 at each actuating pixel 402. A source and drain of the actuating transistor 406 are formed in the substrate with a gate formed as a polysilicon layer. In one embodiment, the actuating transistor 406 is formed as a Thin Film Transistor (TFT), so the substrate 218 in such an embodiment would include a thin poly-crystalline silicon layer for example. Also included in the substrate 218 would be a bulk material, such as glass, for carrying the thin polysilicon layer. While TFT technology can be used to build the active devices disclosed herein, the Figures assume for simplicity that a more traditional crystalline semi conductive substrate 218 is used, although as just mentioned this is not strictly necessary.

In the depicted embodiment, the gate of actuating transistor 406 is electrically connected to a column bus line, denoted as Ca (i.e., column actuating), of the actuating active matrix array 212, and a drain of actuating transistor 406 is electrically connected to a row bus line, denoted as Ra (i.e., row actuating), of the actuating active matrix array 212. Alternatively, the drain may be electrically connected to a column bus line and the gate connected to a row bus line to achieve the same result. Actuating transistor 406 serves as a switch such that application of a voltage to a particular column bus line electrically couples a drain of the actuating transistor 406 to an electrode 215 having a first plate electrically connected to a source connection of actuating transistor 406. As is illustrated, the first plate of electrode 215 is formed from a first metal layer. The second plate represents the droplet being moved, with the ultrahydrophobic surface 210 between the metal and the droplet acting as the dielectric in the capacitor. The bias provided to the second plate is ultimately provided by the pixel to which the droplet is to be moved (i.e., pixel 402' in FIG. 1) as explained further below. Although application of a voltage to a particular column bus line will electrically couple a drain of actuating transistor 406 to an electrode 215 for each of the actuating transistors 406 electrically connected to the particular column bus line, subsequent application of a voltage to a particular row bus line will cause electrical charge to accumulate only at the electrode 215 located in the actuating pixel 402 connected to the particular column bus line and the particular row bus line. Accordingly, each electrode 215 has a unique “address” according to its connection to a single row bus line and a single column bus line of the actuating active matrix array 212.

Similarly, a heating transistor 408 is formed as a field effect transistor in the heating substrate 217 at each heating pixel 404. Like actuating transistor 406, a source and drain of the heating transistor 408 are formed in the substrate (which again can comprise a TFT substrate as noted earlier) with a gate formed as a polysilicon layer. In the depicted embodiment, a gate of heating transistor 408 is electrically connected to a column bus line, denoted as Ch (i.e., column heating), of the heating active matrix array 216, and a drain of heating transistor 408 is electrically connected to a row bus line, denoted as Rh (i.e., row heating), of the heating active matrix array 216. Like actuating transistor 406, heating transistor 408 serves as a switch. However, application of a voltage to a particular column bus line of heating active matrix array 216 electrically couples a drain of the heating transistor 408 to a micro-resistive heating element 224 connected to ground. Heating element 224 is electrically connected to a source connection of heating transistor 408 at one end and a ground reference at another end by means of a first metal layer. Heating element 224 is illustrated as being formed from a polysilicon layer, however, heating element 224 may also be formed from a metal or conductive oxide material. Again, although application of a voltage to a particular column bus line will electrically couple a drain of heating transistor 408 to a micro-resistive heating element 224 for each of the heating transistors 408 electrically connected to the particular column bus line, subsequent application of a voltage to a particular row bus line will cause current to flow only through the heating element 224 located in the heating pixel 404 connected to the particular column bus line and the particular row bus line. Accordingly, each heating element 224 has a unique "address" according to its connection to a single row bus line and a single column bus line of the heating active matrix array 216. With a particular column bus enabled, the amount of current flowing through heating element 224 and thus the heat generated by the element can be adjusted by varying the voltage applied to a row bus of a selected heating element 224. In one embodiment, depending upon the resistance of heating element 224, the applied voltage may measure approximately 5-10 Volts.

As noted above, in one embodiment, the field effect transistor in each pixel of both the actuating active matrix army 212 and the heating active matrix array 216 may be made of thin film semiconductor, such as amorphous silicon, polycrystalline silicon, semiconductor nanowires, semiconducting carbon nanotubes, semiconducting chalcogenide glass, or organic semiconductors.

Figure 4:
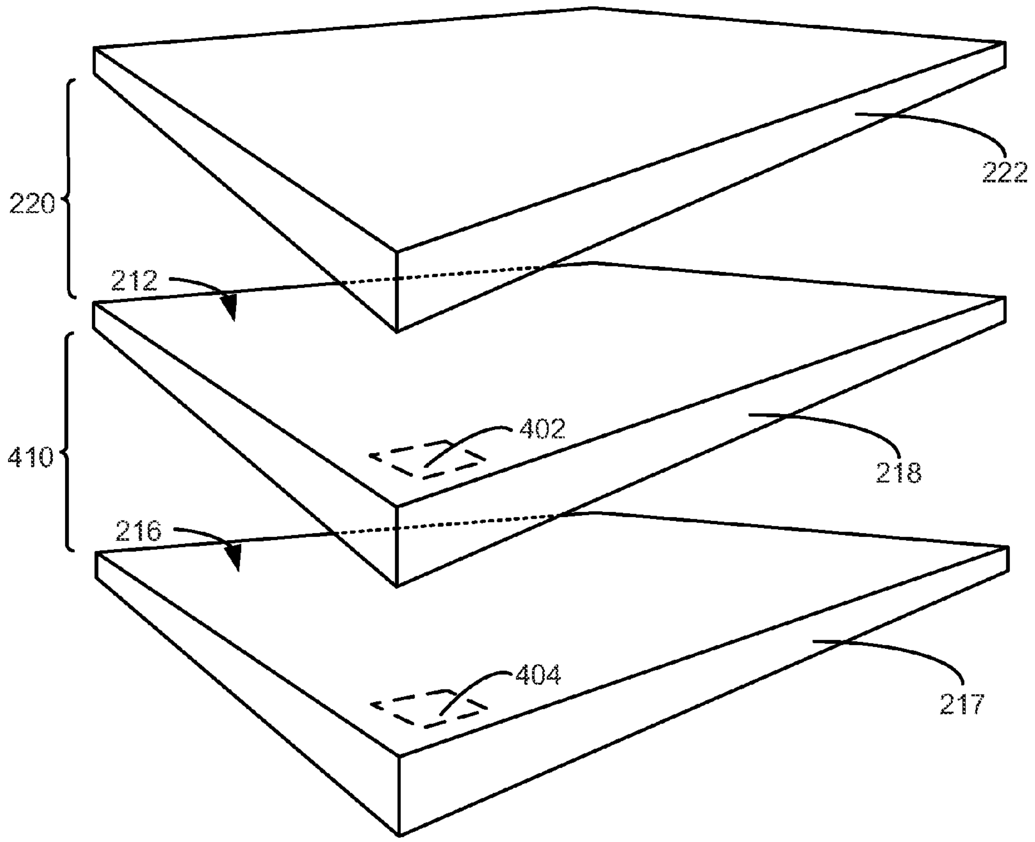
FIG. 4 illustrates an embodiment of the biochip in which the actuating and heating substrates are stacked with the droplet handling area located above both substrates.

Referring to FIG. 4, in an example embodiment, a second implementation of the dual active matrix circuitry biochip is illustrated. The heating active matrix circuitry and the actuating active matrix circuitry may be formed on their respective substrates in the same manner as described above with respect to FIG. 3, however, in the illustrated embodiment, actuating substrate 218 is stacked on heating substrate 217 and droplet handling area 202 is disposed above the substrates rather than between the substrates. As is illustrated, actuating active matrix array 212 and heating active matrix array 216 are formed on a top of their respective substrates, and the top of heating substrate 217 is affixed to the bottom of actuating substrate 218. For purposes of clarity, the actuating substrate 218 and heating substrate 217 are depicted as separated by a relatively large isolation layer 410. In reality, isolation layer 410 is a thin layer of dielectric material that electrically and physically isolates the actuating circuitry from the heating circuitry. Each heating pixel 404 is aligned with a corresponding actuating pixel 402. Heat generated by heating elements 224 in heating pixels 404 is transferred through the dielectric isolation layer 410 and through actuating substrate 218 to individual liquid droplets in the droplet handling area 202 above actuating substrate 218. Because the droplet handling area 202 is above the heating 217 and actuating 218 substrates, the depicted embodiment includes a third substrate, top cap glass 222 to protect droplet handling area 202. However, top cap glass 222 may not be necessary if it is acceptable for fluid droplets to be exposed to ambient conditions. The depicted embodiment may provide advantages for applications in which optical access to the individual droplets is desirable. For example, the depicted embodiment may more easily enable the use of optical techniques such as fluorescence to monitor droplet reactions as droplet handling area 202 is located above the actuating and heating components rather than sandwiched between.

Figure 5:
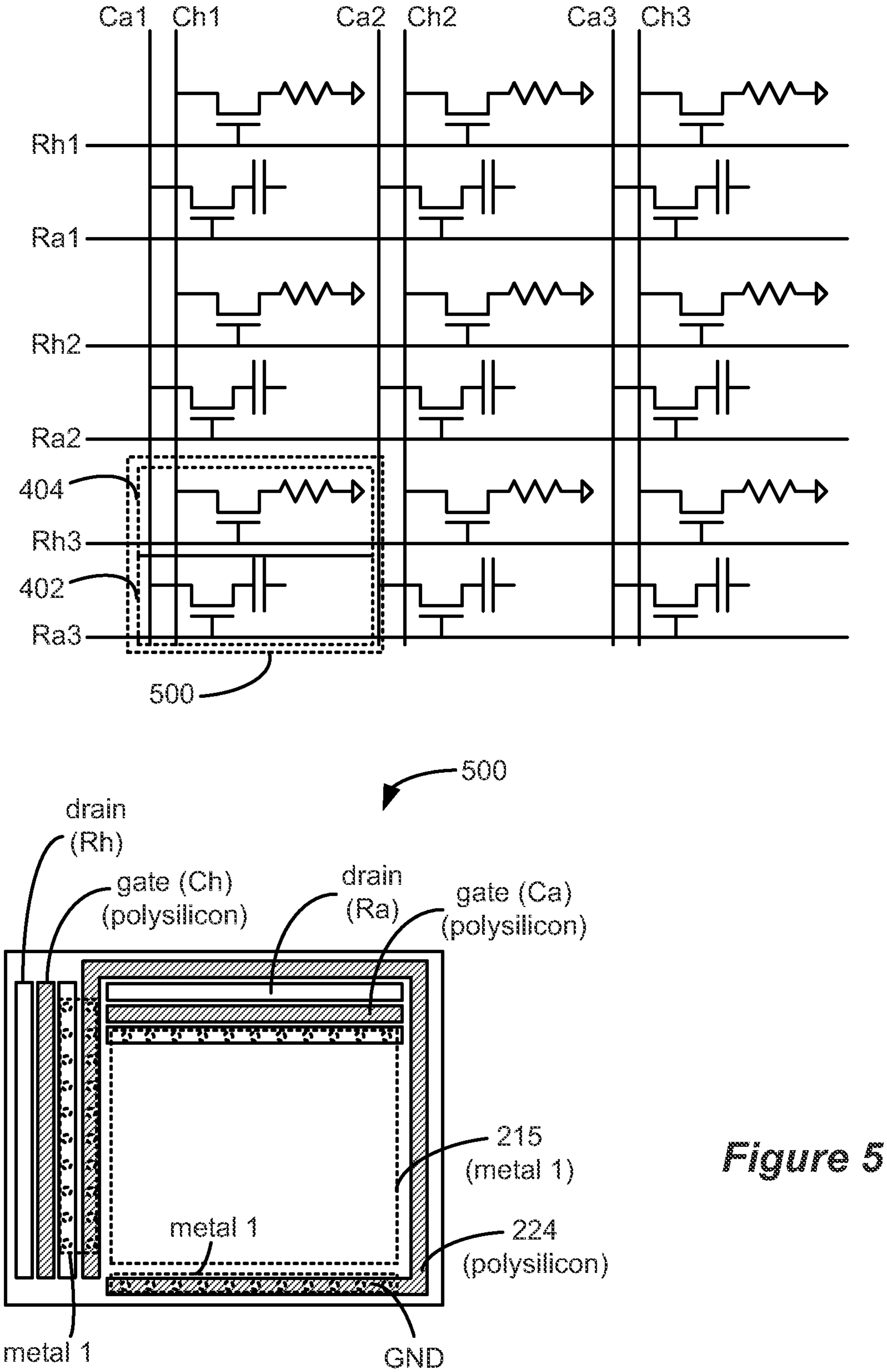
FIG. 5 is a schematic view of a single substrate implementation of the biochip according to one embodiment.

Referring to FIG. 5, in an example embodiment, a further implementation of the dual active matrix circuitry of the biochip is illustrated. In the illustrated embodiment, actuating active matrix array 212 and heating active matrix array 216 are formed on a single substrate. While row and column bus lines for actuating and heating are provided on the same substrate, they are electrically isolated such that the ability to independently heat and actuate fluid droplets is maintained. The electrical components for actuating and heating are formed on the single substrate in a similar manner as in the embodiments described above, however, pixels 402 and 404 form combined pixel 500 that includes an actuating transistor 406 and electrode 215 as well as a heating transistor 408 and heating element 224. In the illustrated embodiment, heating element 224 is formed in a polysilicon layer that wraps around the electrode 215 in pixel 500. Furthermore, each pixel 500 is electrically connected to independently controllable actuating row and column bus lines and heating row and column bus lines. The illustrated embodiment provides the optical access benefits of the embodiment illustrated in FIG. 4 and further provides for direct heating of individual fluid droplets as opposed to the conductive heating of the embodiment illustrated in FIG. 4. As described above with reference to FIG. 4, an additional substrate (i.e., top cap glass 222) may be placed above the single substrate to protect droplet handling area 202. Again, if it is permissible to expose droplet handling area 202 to ambient conditions, top cap glass 222 may not be necessary.

Referring to FIGS. 6A through 6E, in the depicted embodiment, a sequence of droplet movements is illustrated. On the left side, a droplet's current location on an actuating active matrix array 212 is depicted. An arrow within the droplet illustrates a desired movement from the current location. On the right side of each figure, the same active matrix array is depicted without the droplet. A shaded pixel indicates the particular electrode that should be energized in order to perform the desired move.

As can be seen, a droplet overlaps multiple pixels of actuating active matrix array 212. The application of a voltage to a particular electrode in the actuating active matrix array 212 results in electrical charge accumulation in a portion of the droplet in contact with the dielectric material directly above the energized electrode. This charge accumulation results in changes in surface energy at the liquid-dielectric interface and allows for droplet movement according to the EWOD principle. Although the voltage required to induce desired movements is dependent upon the composition of the fluid droplet and the dielectric material, the shaded pixels in the embodiment depicted in FIGS. 6A-6D are described as energized by an 80V source. Because droplet manipulation requires that a droplet overlap multiple pixels, it will be understood that droplets will not be introduced at each row of pixels. For instance, each fluid input port 206 may introduce a fluid droplet into a certain zone of several rows or columns of pixels such that the droplet may be manipulated within its zone without physically or electrically affecting other droplets in the array.

Figure 6A:
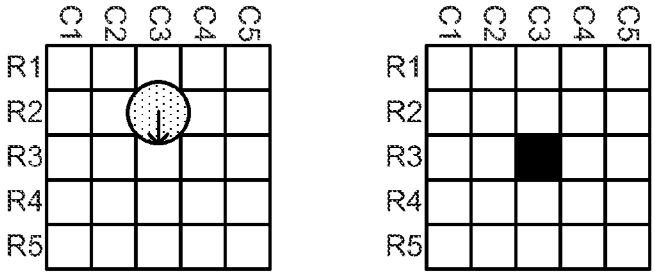
FIGS. 6A-6E illustrate several example movements of a fluid droplet according to one embodiment.

Referring to FIG. 6A, a droplet is centrally located at pixel R2, C3. It is desired to move the droplet to pixel R3, C3. Application of 80V to the electrode located at R3, C3 results in electrical charge accumulation at that portion of the droplet in contact with R3, C3 and causes the droplet to move in that direction.

Figure 6B:
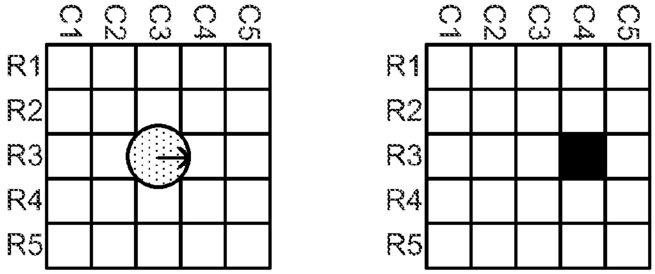

Similarly, referring to FIG. 6B, once the droplet has arrived at pixel R3, C3, it may be desired to move the droplet to pixel R3, C4. Application of 80V to the electrode at R3, C4 again causes the droplet to move in that direction.

Figure 6C:
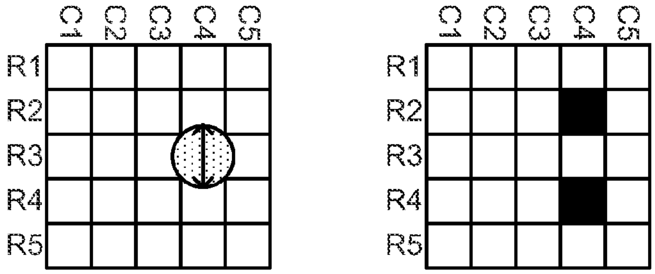

Referring to FIG. 6C, after the droplet has been moved to pixel R3, C4, it may be desired to split the droplet into two droplets. The simultaneous application of 80V to electrodes at pixels R2, C4 and R4, C4 causes the droplet to split into two equal droplets located at pixels R2, C4 and R4, C4.

Figure 6D:
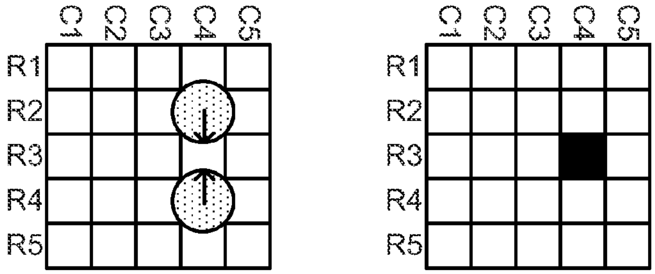
Figure 6E:
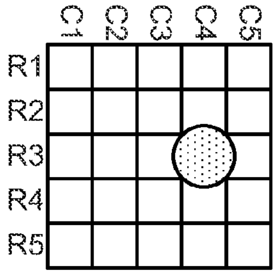

Subsequently, it may be desired to merge the droplets back into a single droplet. Referring to FIG. 6D, application of 80V to the electrode located at pixel R3, C4 results in the droplets located at pixels R2, C4 and R4, C4 merging into a single droplet located at R3, C4 as illustrated in FIG. 6E.

Figure 7:
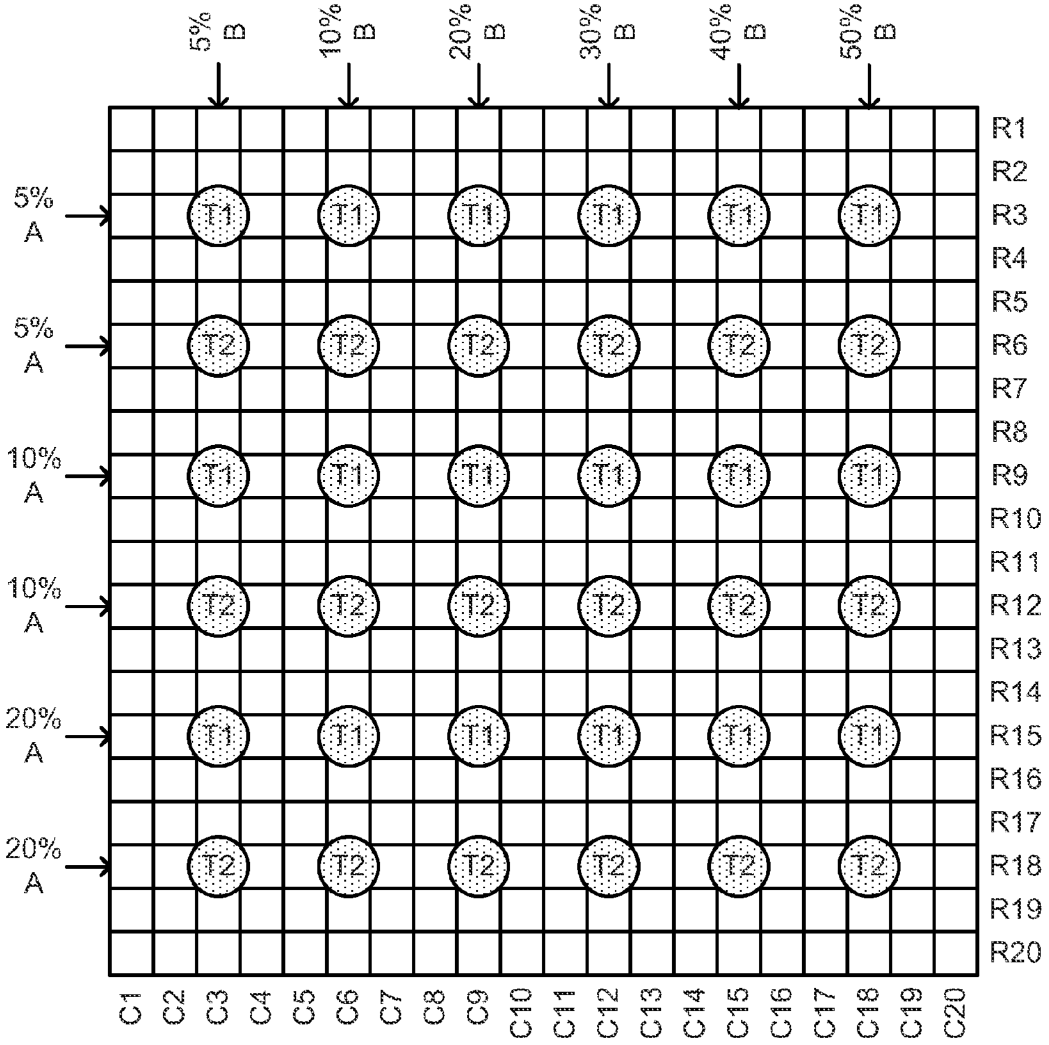
FIG. 7 illustrates an example application of the biochip according to one embodiment.

Referring to FIG. 7, a simple example of the large number of simultaneous reactions that can be performed using the biochip device is illustrated. The illustrated embodiment depicts a theoretical reaction of varying concentrations of solution A with varying concentrations of solution B. Three concentrations of solution A (5%, 10%, and 20%) are introduced through fluid input ports 206 along one edge of the biochip. Each concentration of solution A is duplicated such that reactions can be performed at two different temperatures utilizing the heating active matrix array 216. Although FIG. 7 illustrates each concentration of solution A as being provided through two separate fluid input ports 206, it will be understood that each concentration of solution A may also be introduced through a single input port 206 with droplets manipulated to the proper location using the active matrix array 212. Six concentrations of solution B (5%, 10%, 20%, 30%, 40%, and 50%) are introduced through fluid input ports 206 along an edge of the biochip adjacent to the introduction of solution A. Droplets on the array depict the reaction resulting from the merging of a solution A droplet with a solution B droplet at the intersection of the particular row and column of the solutions. Moreover, the temperature maintained by the heating active matrix array 216 is indicated within the droplet. The following table illustrates the large number of unique reaction conditions capable of being performed simultaneously using this simple example.

| Row | Column | Solution A | Solution B | Temperature |
|---|---|---|---|---|
| 3 | 3 | 5% | 5% | T1 |
| 3 | 6 | 5% | 10% | T1 |
| 3 | 9 | 5% | 20% | T1 |
| 3 | 12 | 5% | 30% | T1 |
| 3 | 15 | 5% | 40% | T1 |
| 3 | 18 | 5% | 50% | T1 |
| 6 | 3 | 5% | 5% | T2 |
| 6 | 6 | 5% | 10% | T2 |
| 6 | 9 | 5% | 20% | T2 |
| 6 | 12 | 5% | 30% | T2 |
| 6 | 15 | 5% | 40% | T2 |
| 6 | 18 | 5% | 50% | T2 |
| 9 | 3 | 10% | 5% | T1 |
| 9 | 6 | 10% | 10% | T1 |
| 9 | 9 | 10% | 20% | T1 |
| 9 | 12 | 10% | 30% | T1 |
| 9 | 15 | 10% | 40% | T1 |
| 9 | 18 | 10% | 50% | T1 |
| 12 | 3 | 10% | 5% | T2 |
| 12 | 6 | 10% | 10% | T2 |
| 12 | 9 | 10% | 20% | T2 |
| 12 | 12 | 10% | 30% | T2 |
| 12 | 15 | 10% | 40% | T2 |
| 12 | 18 | 10% | 50% | T2 |
| 15 | 3 | 20% | 5% | T1 |
| 15 | 6 | 20% | 10% | T1 |
| 15 | 9 | 20% | 20% | T1 |
| 15 | 12 | 20% | 30% | T1 |
| 15 | 15 | 20% | 40% | T1 |
| 15 | 18 | 20% | 50% | T1 |
| 18 | 3 | 20% | 5% | T2 |
| 18 | 6 | 20% | 10% | T2 |
| 18 | 9 | 20% | 20% | T2 |

-continued

| Row | Column | Solution A | Solution B | Temperature |
|---|---|---|---|---|
| 18 | 12 | 20% | 30% | T2 |
| 18 | 15 | 20% | 40% | T2 |
| 18 | 18 | 20% | 50% | T2 |

As illustrated in FIG. 7, a large number of reactions of varying conditions can be performed simultaneously utilizing the dual active matrix biochip. A researcher may therefore quickly identify optimal conditions for a proposed reaction using very small liquid volumes.

The implementation of dual active matrix circuitry to provide for independent actuation and heating of liquid droplets as well as the ability to customize the biochip with computer software to suit application specific needs overcomes major limitations of conventional biochip devices. The biochip can conceivably be scaled up to handle more than a million droplets at one time for tackling complex analytical and synthetic problems. The biochip also minimizes contamination by using ultrahydrophobic surfaces. It can be easily cleaned and recycled for different tasks and therefore incurs very low cost overhead in practical usage. Envisioned applications of the biochips include genomic and proteomic analyses, immunoassays, single cell study, clinical diagnostics, toxin and environmental monitoring, new drug development, fine-chemical synthesis and more. Further integration of components such as light-emitting devices, photodetectors, advanced pixel biasing schemes, immobilization schemes, bio- and chemical sensors, and application-specific functionalities electrophoresis and dielectrophoresis in a droplet or a fluid segment) into the active matrix pixels is possible to incorporate more functionality into the biochip.

The massive parallelism and unlimited sequential droplet operations provide unprecedented fluid processing power and allow scientists and engineers to tackle complex biological research problems previously deemed prohibitive, allowing the biochip to be used as a great tool for scientific discovery and engineering development. Furthermore, this biochip can be used for complex fluid pre- or post-processing when integrated with other existing application specific lab-on-a-chip devices. In such an arrangement, the disclosed biochip device may be considered a central fluidic processing unit (CFPU), analogous to a central processing unit (CPU) in a microelectronic system, which will bring revolution to biochip design and development. Modular integration has led to great success in the microelectronic industry. By combining the CFPU with various application specific lab-on-a-chip modules, complex analytical and synthetic systems can be achieved with ease for advanced biomedical applications.

Several illustrative applications of the disclosed biochip device are discussed below.

Example 1

Protein Crystallization

Proteomics is an increasingly important research topic in biological and biomedical research after genomics. The goal of proteomics research is to determine the structures and functions of proteins on a large scale. Production of high quality protein crystals is the first step in determining their three dimensional structures. However, protein crystallization is affected by many factors such as temperature, pH, precipitants and concentrations of the protein solutions. Current screening for protein crystallization is mainly based on trial and error techniques to find the optimal crystallization conditions, which requires a large number of tests to be carried out for each protein. Though such large scale screening can be performed by automatic tools, there is a growing trend in developing microfluidic devices to further reduce the time, labor and the amount of protein sample that are needed in screening tests.

The disclosed biochip is an ideal tool in determining the optimal crystallization conditions from a large number of trials. Screening experiments for protein crystallization may be carried out with the biochip. The biochip may be employed to complete two different tasks. First, a series of protein and salt solutions with different concentrations can be automatically prepared by the digital biochip. Starting from a concentrated solution, tower concentration solutions can be achieved by mixing a droplet of the protein or the salt solution with a droplet of a buffer solution or water. The volume of each droplet may be on the order of a microliter. The merged droplets can be split into two droplets, each with a concentration equal to half of the parent protein or salt solution. The droplet can be mixed again with a droplet from the parent solution or buffer solution to further adjust (increase or decrease) its concentration. After a series of droplet moving, merging, and splitting, a group of droplets with a series of concentration levels can be achieved without any human intervention. After the droplets of desired concentrations are achieved, the biochip may perform a second task of combining the protein and salt solutions to search for the optimal condition for protein crystallization. This can be easily achieved by the digital biochip through row and column fluid input ports. Protein solutions of various concentrations can be connected to the row inputs and salt solutions of various concentrations can be connected to the column inputs. The digital biochip will combine each droplet in a row with every droplet in a column, thus an array of crystallization experiments can be processed simultaneously. After incubation, protein crystals can be observed with a polarizing microscope. During the test, the humidity can be controlled to minimize droplet evaporation. The first and second tasks can all be automatically and seamlessly performed on the biochip in sequence. The biochip can be easily cleaned by running de-ionized water droplets through the pixels in the array after the experiment, allowing a subsequent batch of tests can be conducted immediately. After the optimal crystallization condition is found, the same digital biochip can be quickly reconfigured to perform biosynthesis operations by making and mixing protein and salt droplets with optimized concentrations. This allows a relatively large amount of high quality crystals to be synthesized for structural analysis by XRD.

Example 2

Portable Detection of Chemical and Biological Hazardous Materials, Warfare Threat Agents, Illicit Drugs, and Environmental Pollutants The foremost task of an effective chemical and biological defense is the fast and sensitive detection and accurate identification of chemical and biological warfare agents. With its capability and flexibility, the proposed digital biochip can greatly advance the state of the art of a portable detection system for chemical and biological threat agents.

The desired qualities of modern day chemical and biological detection technologies are sensitivity (detecting low concentration), selectivity (minimizing interference from other species in solution to avoid false report), specificity (identifying the warfare agents accurately), and multi-analytes capability (simultaneous detection of multiple hazards such as bacterial, toxins, virus and chemicals in one sample). For in-field detection and identification, additional requirements are portability, fast response, multiple-matrices capability (dirt, mud, water, blood and other body fluids) with minimal sample pre-processing, and high throughput (capability to handle a large number of samples in a short time). Current detection technologies can be divided into two major categories: mass spectrometry (MS) and enzyme-linked immunosorbent assay (ELISA). There are multiple variations in each category, mainly differing in the methods of sample preparation and the implementation of detection mechanisms. Mass spectrometry is highly sensitive, highly specific, and capable of identifying and quantifying unknown agents simultaneously. However, it requires access to sophisticated mass spectrometer equipment and data analysis requires highly trained personnel. Coupled with its high cost, these disadvantages make it impractical for point-of-care detections on a battlefield. ELISA is also a well-established technology that has high sensitivity. The main disadvantages of the traditional ELISA are lengthy assay time and limited throughput due to multiple washing steps. Nowadays simultaneous detection of a large number of warfare agents is imperative because the details of a chemical and biological attack cannot be known up front, thus conventional ELISA technology is also unsuitable for field applications.

The proposed digital biochip can be configured as a detection platform based on immunoassays and it can overcome the aforementioned problems in MS and ELISA technologies. For chemical and biological threat agent detection, different antibodies can be introduced at the row fluid input and different samples to be analyzed can be introduced at the column fluid input. By moving, mixing, and splitting droplets, immunoassays can be accomplished by combining a droplet from the antibody solutions and a droplet from the samples. Large numbers of assays (depending on the number of rows and columns) can be performed simultaneously. Since the size of the active-matrix array is virtually unlimited, this biochip can detect and identify a huge number of chemical and biological warfare agents in one test. The throughput is very high due to the parallel processing of multiple samples. The digital biochip may also be configured to perform multiple analyses of the same sample for better repeatability to minimize false reports. Recent developments of novel separation techniques (e.g., solid-surface binding with magnetic microspheres) and detection mechanisms (e.g. fluorescence enhancement by surface plasma resonance and quantum dot based fluorophores) in immunoassay technology have improved its sensitivity and reduced assay time. The freedom in performing assay in a droplet allows these technologies to be seamlessly integrated into the biochip to achieve the best performance. Based on the performance of currently reported detection techniques, a proposed digital biochip with a 32×32 array can perform 256 assays simultaneously for 16 threat agents in 16 samples with detection sensitivity better than 0.1 ng/ml and assay time shorter than 5 minutes, which are all great improvements over the state of the art capability and performance. All assays are done fully automatically through driving the active matrix circuitry from a control board. Since the operation principles of the digital biochip are independent of a specific application, such abstraction in biochip implementation allows for the same biochip to be used for different biological and chemical assays once the assay protocol is established and optimized based on the physics and chemistry of the assay task. Coupled with a huge array size, this feature ensures that the digital biochip will be able to detect and identify future unknown hazardous materials with unbounded potential. The ability to combine these advantages into a single platform ensures that the biochip is a viable solution for real time and in field multi-analyte threat agent detection and identification.

Example 3

Drug Screening Based on Combinatorial Chemistry

In new drug discovery, it is often necessary to perform a large amount of biochemical reactions to select the most effective drugs from a large pool of candidates. This can be a tedious process that costs tremendous amounts of time and resources. The fully automated digital biochip is ideally suited for this purpose, it automates large parallel reactions to quickly sieve through drug candidates to identify the most efficacious target. Due to its virtually unlimited scaling power, the digital biochip may dramatically speed up the discovery of new drugs, while at the same time significantly lowering the cost of research and development.

Example 4

Custom Printing of Microarray Chips (DNA, Protein, Chemical Compound, Antibody, Tissue, Cellular, Etc)

Microarrays are a widely used and powerful technique for modern day biological research and bioengineering. A microarray substrate contains two-dimensional microscopic spots on a fiat surface. Depending on the chemical and biological content inside the spot, microarrays can be categorized into DNA, protein, antibody, tissue, cellular, and chemical compound microarrays. Each type of array is very useful in specific chemical and biological applications. Currently, microarray fabrication requires complicated fabrication schemes, which involve many lithographic steps. The cost of microarrays can be very high, which limits their applications.

The novel digital biochip can be used to "print" custom microarrays with high throughput and low cost. The predesigned array information can be sent to the digital biochip, which will generate droplets that contain specific chemical or biological reagents. The digital biochip can then arrange the droplets into a 2D array on its surface. A substrate that has a hydrophilic surface can be brought into contact to the top of the droplets. Upon contacting, the droplets will be transferred to the substrate. When droplets evaporate, they deposit the chemical and biological reagents inside the droplet onto the substrate surface, completing the fabrication of 2D microscopic spots. The disclosed heating active matrix array may be used to increase the rate of evaporation. By simply changing the content in the droplet, all types of microarray substrates can be fabricated with ease. This technique is particularly powerful in terms of generating custom microarrays rather than commercially available microarrays that are produced with standard libraries in batches.

It is to be understood that the above description and examples are intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device for manipulating droplets of fluid, comprising:

a first substrate comprising a plurality of pixels arranged in rows and columns, each pixel comprising:

a first switch coupled to an electrode, wherein each first switch is controllable to move a droplet with respect to its associated electrode; and a second switch coupled to a heating element, wherein each second switch is controllable to heat a droplet proximate to its associated heating element;

a second substrate; and a droplet handling area disposed between the first substrate and the second substrate, wherein the droplet handling area comprises at least one fluid input port for introducing a droplet into the droplet handling area, and at least one fluid output port for removing a droplet from the droplet handling area, wherein the second switch is controlled independently of the first switch.

2. The device of claim 1, wherein the droplet handling area further comprises at least one spacer between the first and second substrates.

3. The device of claim 1, further comprising a hydrophobic layer between the first substrate and the droplet handling area.

4. The device of claim 1, further comprising a first row and a first column coupled to each first switch, and a second row and second column coupled to each second switch.

5. The device of claim 4, wherein the first row, first column, second row, and second column are independently controllable.

6. The device of claim 4, wherein each first switch comprises a transistor, and wherein each second switch comprises a transistor.

7. The device of claim 1, wherein the heating element comprises a resistor.

* * * * *